United States Patent [19]

Lindemann

[11] Patent Number: 4,712,634
[45] Date of Patent: Dec. 15, 1987

[54] CONTROL SYSTEM FOR A MOTOR VEHICLE ENGINE TO PREVENT SLIPPING OF THE VEHICLE DRIVE WHEELS DURING ACCELERATION

[75] Inventor: Klaus Lindemann, Hanover, Fed. Rep. of Germany

[73] Assignee: Wabco Westinghouse Fahrzeugbremsen GmbH, Hanover, Fed. Rep. of Germany

[21] Appl. No.: 938,695

[22] Filed: Dec. 5, 1986

[30] Foreign Application Priority Data

Dec. 14, 1985 [DE] Fed. Rep. of Germany ....... 3544294

[51] Int. Cl.$^4$ ............................................. B60T 8/04
[52] U.S. Cl. ................................... 180/197; 180/175
[58] Field of Search .............. 180/197, 175, 176, 177; 123/342; 60/413

[56] References Cited

U.S. PATENT DOCUMENTS 3,776,355 12/1973 Scherenberg ..................... 180/197
4,432,430 2/1984 Lind et al. ......................... 180/197
4,545,455 10/1985 Kanemura et al. ................ 180/197

Primary Examiner—John J. Love
Assistant Examiner—Donn McGiehan
Attorney, Agent, or Firm—G. J. Falce

[57] ABSTRACT

A system for automatically overriding operator control of engine power delivered to the drive wheels of a motor vehicle when a wheel slip condition is detected during vehicle acceleration. A pneumatic actuator in the engine fuel control circuit is operated in a controlled manner to cause the engine fuel lever to initially decrease power at a relatively fast rate and then at a relatively slow rate to alleviate the wheel slip. Once the wheel slip condition is corrected, the actuator is reset in a controlled manner, which allows the fuel lever to restore engine power, initially at a relatively fast rate and subsequently at a relatively slow rate, such rate controlled adjustment of engine power during each wheel slip control cycle providing less cyclic control of the wheel slip correction process, and accordingly a smoother acceleration.

6 Claims, 4 Drawing Figures

CONTROL SYSTEM FOR A MOTOR VEHICLE ENGINE TO PREVENT SLIPPING OF THE VEHICLE DRIVE WHEELS DURING ACCELERATION

BACKGROUND OF THE INVENTION

The invention relates to a method and an apparatus for start-up control on motor vehicles.

Start-up control systems of the prior art are intended to prevent an uncontrolled slipping of the drive wheels when movement of the vehicle is started on a smooth surface (DE-PS No. 18 08 799). Such slipping unnecessarily prolongs the time required to accelerate the vehicle to running speed and reduces its traction, as well as lateral stability.

The slipping of the drive wheels is measured by rotation sensors located on the wheels and is evaluated in an electronic system. If only one wheel is slipping, the corresponding wheel brake is activated, e.g., via a valve (differential brakes). A drive torque is thereby transmitted via the wheel differential to the other stopped wheel.

However, if both wheels are slipping, the power of the engine is adjusted downward. For this purpose, an intervention in the carburetor throttle control must be made, and the value set by the driver must be reduced. This occurs, for example, by means of interposed electrical solenoid actuators or a pneumatic or hydraulic work cylinder.

With the configuration described above, the gas is taken away from the engine as soon as one wheel on the drive axle starts to slip. This is recognized by the occurrence of a +b control signal (acceleration signal of one wheel). Then, as soon as the +b signal has disappeared, the gas setting desired by the driver is re-established.

Such a control concept (black-white control) naturally causes a relatively uncomfortable acceleration of the vehicle.

The object of the invention, therefore, is to provide a system by means of which the vehicle start-up operation can be executed without passenger discomfort. A prerequisite, however, is that, as in the prior art, there is only one black-white signal present to indicate the slipping of the drive wheels.

DESCRIPTION AND OPERATION

Figure 1:
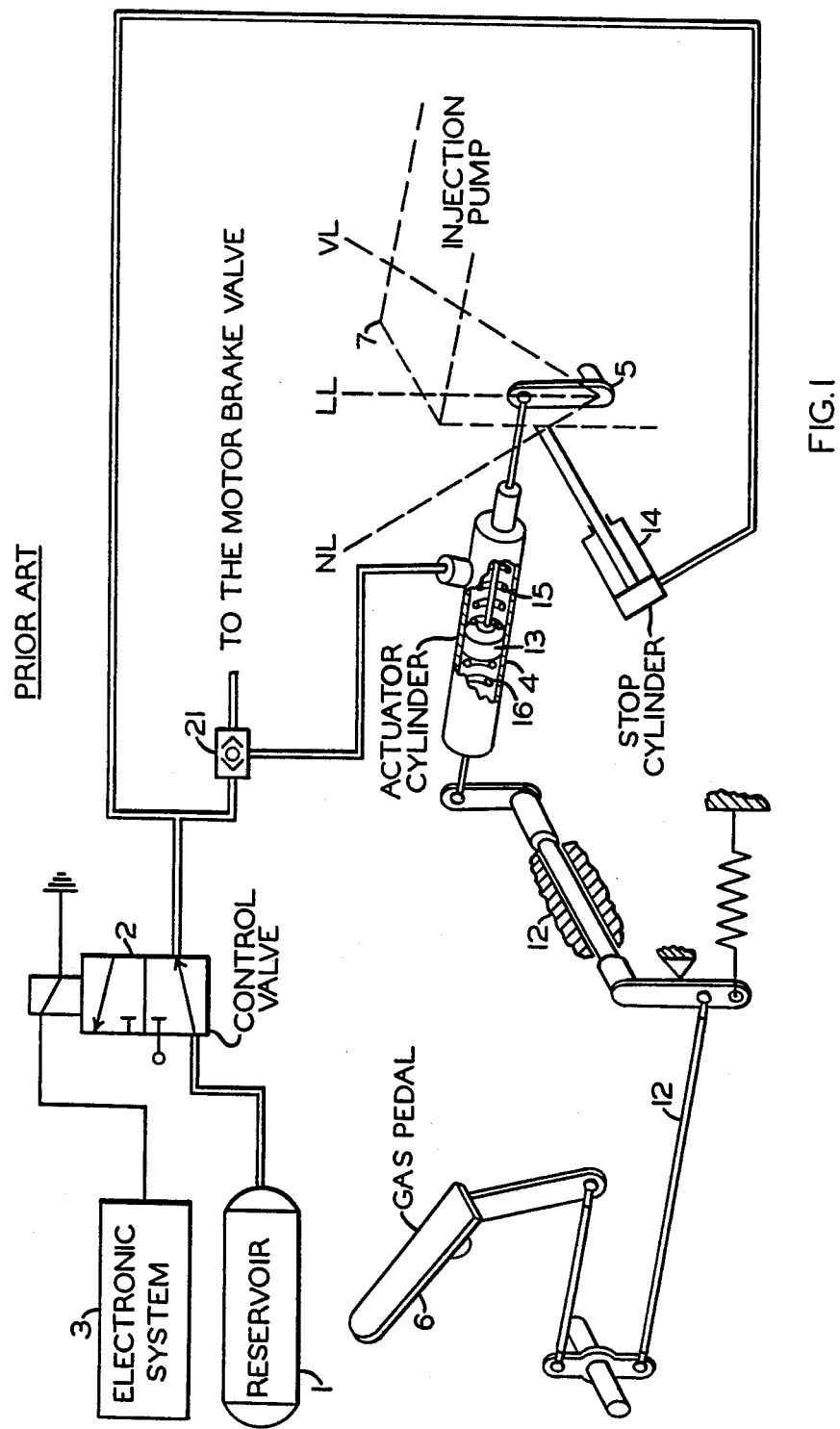
FIG. 1 shows, schematically, an apparatus of the prior art for vehicle start-up control with a mechanical carburetor throttle control.

As shown in FIG. 1, a gas pedal 6 is connected via a mechanical linkage 12 and via an actuator cylinder 4 with a lever 5 of an injection pump 7. The injection pump 7 regulates the fuel feed to an engine (not shown). The lever 5 can be placed in the positions zero-load (NL), idle (LL) and full-load (VL). There is a stop cylinder 14 so that the lever 5 is not allowed to drop below the idle position (LL) while the vehicle is in motion.

The actuator cylinder 4 in the carburetor control linkage 12 reduces the fuel fed to it by the driver, if necessary, as when the drive wheels slip. Normally, the piston 13 of the actuator cylinder 4 is centered by springs 15 and 16 in a middle position. When the accelerator pedal pressure applied to the actuator cylinder 4 via linkage 12 decreases, piston 13 is retracted, whereupon the lever 5 of the injection pump 7 is moved in the direction of lower power.

The actuator cylinder 4 is supplied by a pressure medium from a reservoir 1 via a control valve 2. The control valve 2 is electrically activated by an electronic system 3. It is designed as a 2-position, 3-way valve. Its output is connected to the actuator cylinder 4 by means of a shuttle valve. There is also a connection to the stop cylinder 14. A motor brake valve is also connected to the shuttle valve 21.

The apparatus illustrated in FIG. 1 operates as follows:

As soon as the drive wheels of the vehicle begin to slip, i.e., as soon as their velocity exceeds the vehicle speed by a specified velocity $\Delta V$, the electronic system transmits a signal to the control valve 2. The latter then opens and connects the reservoir 1 with the actuator cylinder 4. The actuator cylinder is shortened until the lever 5 of the injection pump 6 is pivoted into the idle position LL. In this position, the lever 5 is held by the stop cylinder 15.

On account of the power reduction of the engine effected in this manner, the speed of the drive wheels again approaches the speed of the vehicle. Then the slip signal of the electronic system 3 disappears, the control valve 2 evacuates the actuator cylinder 4, and the acceleration originally set by the driver is resumed. This control sequence (black-white regulation) is repeated until the drive wheels cease slipping.

A disadvantage with the black-white regulation described is that relatively steep gradients result for the wheel velocities of the drive wheels, therefore causing a wheel slip which on one side is relatively large and on the other side is practically zero. The resulting large slip amplitudes reduce the stability of the vehicle during the start-up process. On the other hand, the temporary absense of a drive slip leads to a discontinuous acceleration of the vehicle. The overall result, therefore, is an uncomfortable control curve.

To achieve a better control characteristic of the start-up regulation, the slip amplitudes must, if possible, be kept in an optimal slip range of approximately 20%, and the wheel velocitities must exhibit gradients which are as flat as possible, and in the control pauses, the drive wheels should not equal the vehicle speed, and thus zero slip.

This is achieved by the invention in that the pressure in the actuator cylinder 4 is controlled in the form of a steep-drop characteristic curve. An apparatus by means of which this can be achieved is illustrated schematically in FIG. 2.

Figure 2:
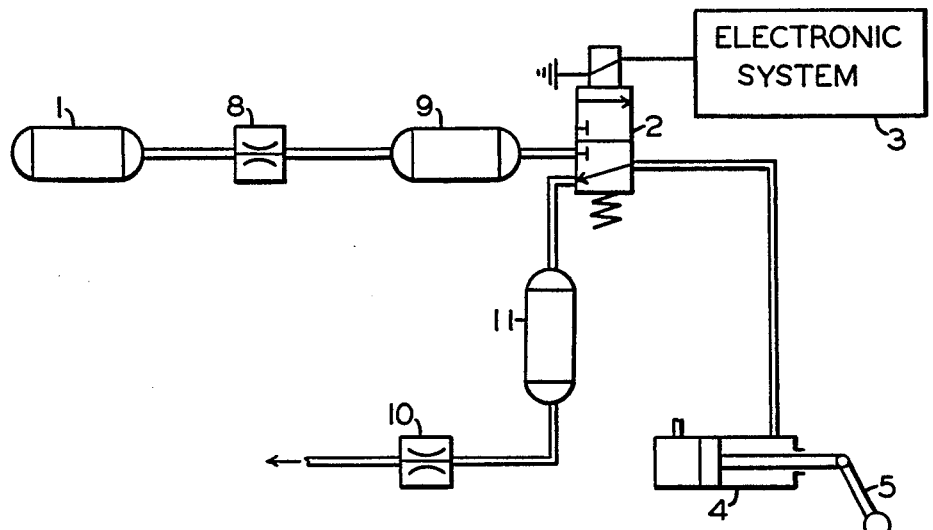
FIG. 2 shows an improved apparatus in accordance with the present invention.

As shown in FIG. 2, between the reservoir 1 and the control valve 2, there is a first flow restrictor 8, as well as a first volume 9. In the evacuation line of the control valve 2, there is a second volume 11 and a second flow restrictor 10. Otherwise, the apparatus shown in FIG. 2 is the same as in FIG. 1, whereby components which are not directly part of the invention are not shown.

Figure 3:
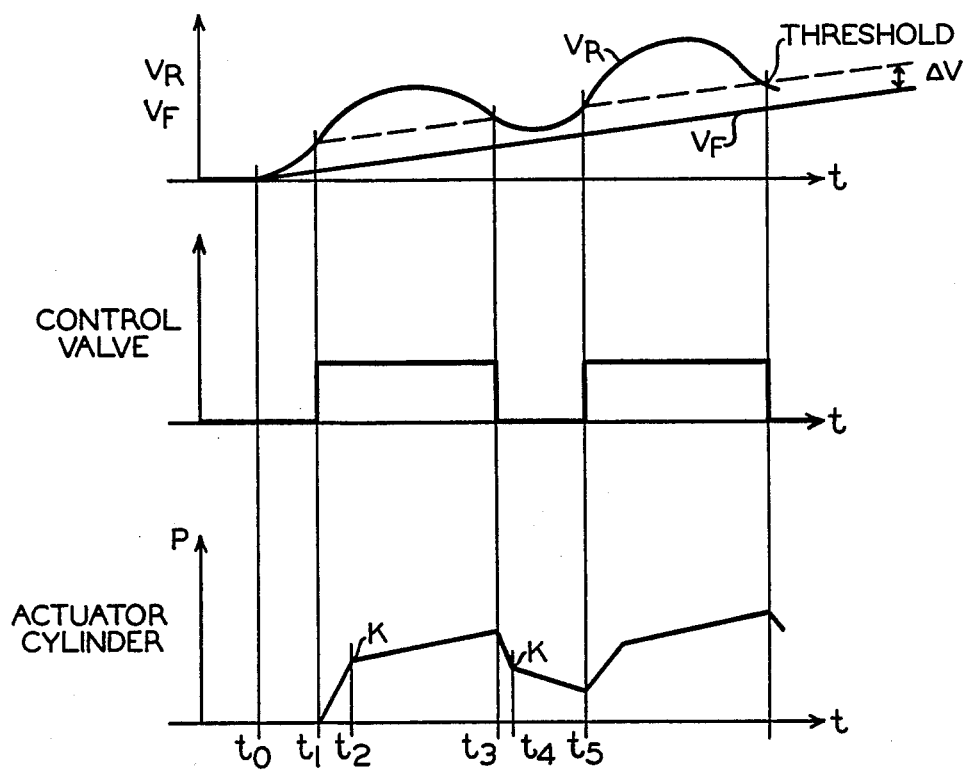
FIG. 3 shows a diagram illustrating velocity and pressure curves, with reference to FIG. 2.

The operation of the apparatus illustrated in FIG. 2 is explained in greater detail below, in connection with the diagrams presented in FIG. 3.

It is assumed that the slipping of the wheels begins at time $t_0$. At this time, therefore, the wheel velocity $V_R$ begins to differ from the vehicle velocity $V_F$. At time $t_1$, the difference between the wheel velocity and the vehicle velocity is already so large that a predetermined threshold value $\Delta V$ is reached. At this point, the first phase of a wheel slip control cycle is initiated during which the electronic system 3 gives a signal to the control valve 2, which thereupon switches into the position which pressurizes the actuator cylinder 4. The first volume 9 is connected to cylinder 4, which initially leads to a rapid pressure increase of the pressure p in the actuator cylinder 4. At time $t_2$ (steep drop K), the pressure of first volume 9 has been reduced by pressure equalization with the actuator cylinder 4. After this initial steep pressure increase, the action of the first flow restrictor 8 leads to a further gradual pressure increase, since now the higher pressure in volume 1 flows to volume 9, and hence to cylinder 4, via flow restrictor 8. This first phase of the wheel slip control cycle, is terminated at time $t_3$, at which point the wheel velocity $V_R$ corresponds to the threshold value.

At time $t_3$ the electronic system 3 recognizes that the wheel velocity $V_R$ begins to fall below the threshold value $\Delta V$, and switches the control valve 2 back into the initial position (shown). This initiates a second phase of the wheel slip control cycle. In this position, the actuator cylinder 4 is evacuated. The evacuation takes place, initially rapidly, into the second volume 11, which is void of pressure. After the steep-drop K (volume equalization) is reached, at time $t_4$ evacuation continues to take place at a slower rate via the second flow restrictor 10 until, at time $t_5$, the wheel velocity $V_{Ra}$-gain increases to a value that exceeds the wheel slip threshold value $\Delta V$ and the control cycle is repeated.

The initially steep pressure gradient in the actuator cylinder 4 is primarily intended to overcome the hysteresis of the overall activation mechanism, and to brake or accelerate the drive wheels as rapidly as possible. The subsequent gradual pressure gradient then causes the motor and thus the drive wheels not to react in an uncontrolled manner, and the control point is reached relatively precisely, without significant over-control or under-control. The resulting control frequency is approximately 2 to 3 Hz.

The steep-drop characteristic of the pressure in the actuator cylinder 4 achieved by the invention can also be achieved in another way. It is conceivable, for example, to use a proportional valve instead of the 2-position, 3-way control valve. The proportional valve would then be controlled by the electronic system 3 so that first of all, a large cross section flow path would be set, and after a predetermined time had elapsed, the flow path would be reduced to a smaller value. The same would be true both for the pressurization and for the evacuation of the actuator cylinder 4.

Another possibility would be to use an electrically-operated solenoid actuator instead of the actuator cylinder 4, and to apply an appropriately graduated current to it by means of the electronic system 3.

Instead of using the separate volumes and flow restrictors shown, it is also possible to replace these components by means of a corresponding configuration of the length and the diameter of the connecting lines of the control valve 2.

Figure 4:
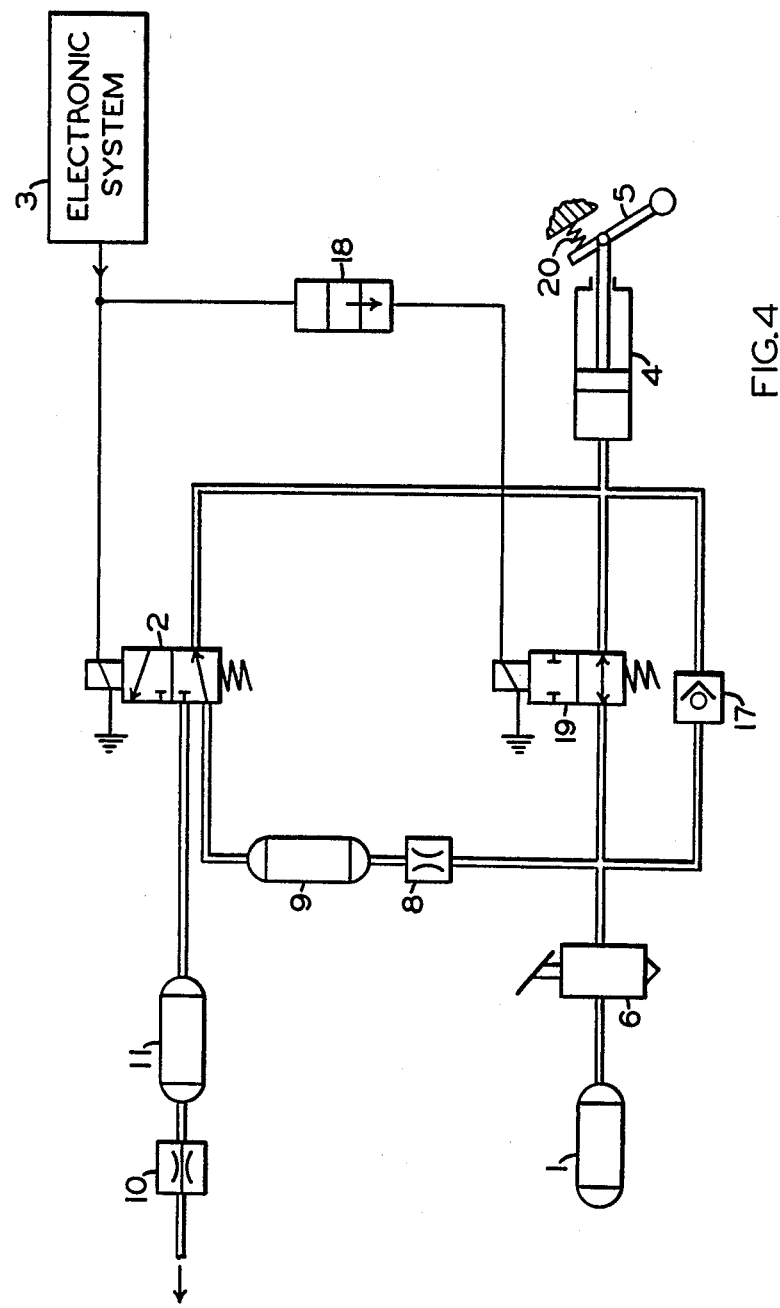
FIG. 4 shows a variant of the invention with pneumatic control of the carburetor throttle.

FIG. 4 shows another arrangement of the start-up control. In FIG. 4, the lever 5 of the injection pump is not activated by means of a mechanical linkage, but pneumatically. During normal travel, the driver controls the gas pedal 6, which here is designed as a pedal-operated valve, and which supplies a graduated control pressure from the reservoir 1 via a normally-open 2-position, 2-way valve 19 to an actuator cylinder 4. The piston of the actuator cylinder 4 is connected with the adjustment lever 5 of the injection pump. When the piston moves out of the actuator cylinder 4, the adjustment lever 5 is moved to the right against the force of a spring 20, whereupon the power of the motor is increased.

If now, during starting, the drive wheels of the vehicle begin to slip, the situation is recognized by the electronic system 3. The electronic system 3 then emits a signal to valve 19 and to control valve 2. In the electrical control line to the multiway valve 19, there is a timer 18 with a delay.

In the evacuation line of control valve 2, there is again a second volume 11 and a second flow restrictor 10. The input line of the control valve 2 is connected with the output of the pedal-operated valve 6 via a first volume 9 and a first flow restrictor 8. Finally, the multiway valve 19 is bridged by a check valve 17.

The apparatus illustrated in FIG. 4 operates as follows:

The illustrated situation is normal operation, in which the driver can give gas to the engine unhindered through the open multiway valve 19.

As soon as the electronic system 3 recognizes a slipping of the drive wheels, the position of both valves 2 and 19 is reversed. The multiway valve 19 closes, and the driver's direct influence on the engine is overridden. The control valve 2 is switched to evacuate. The actuating cylinder 4 is thereby evacuated via the second volume 11 and the seconf flow restrictor 10, by pressure equalization between volume 11 and actuating cylinder 4 and then slowly by flow of this equalized pressure via choke 4, so that the steep-drop characteristic mentioned above is achieved.

As soon as the electronic system 3 recognizes that the slipping of the drive wheels has stopped, the control valve 2 is switched back into the position shown. The multiway valve 19, as a result of the delay of the timer 18, remains in the closed position, however. The renewed pressurization of the actuator cylinder 4 is now accomplished initially by the contents of the volume 9 and then by the volume 1 via the first flow restrictor 8. Here, too, pressurization is accomplished first rapidly by pressure equalization between volume 9 and actuating cylinder 4, and then slowly by restricted pressure equalization from additional volume 1.

The check valve 17 makes certain that the driver, if necessary, can let up on the gas at any time, even if the multiway valve 19 is closed. In this case, the actuator cylinder 4 is evacuated via the check valve 17 and the pedal-operated valve 6.

I claim:

1. A wheel slip control system for regulating the power of a motor vehicle engine when a wheel slip condition of said vehicle arises upon acceleration thereof, comprising:
   (a) an operator-controlled accelerator pedal;
   (b) a fuel control lever;
   (c) a mechanical linkage between said accelerator pedal and said fuel control lever via which said fuel control lever is operated in accordance with the selected position of said accelerator pedal to control the power produced by said motor vehicle engine;

(d) at least one wheel driven by said motor vehicle engine;

(e) means for sensing the driven rotational speed of said at least one wheel;

(f) evaluation means for detecting said wheel slip condition of said vehicle in response to the sensed rotational speed of said at least one wheel exceeding a predetermined threshold value;

(g) a fluid pressure actuator cylinder having a piston operatively connected in said mechanical linkage;

(h) first and second reservoirs normally charged with fluid under pressure;

(i) a first fluid flow restrictor via which fluid pressure communication is established between said first and second reservoirs; and (j) a control valve having a supply port connected to one of said first and second reservoirs and an outlet connected to said actuator cylinder, said control valve being operated from a first position in which said supply port is cut off from said outlet to a second position in which said supply port is communicated with said outlet when said wheel slip condition is detected by said evaluation means, whereby said actuator cylinder is pressurized initially at a relatively fast rate and thence at a relatively slow rate to urge said piston in a direction to override said accelerator pedal control of said fuel control lever to accordingly effect a decrease of the power produced by said motor vehicle engine.

2. A wheel slip control system, as recited in claim 1, further comprising:

(a) a third reservoir;

(b) a second fluid flow restrictor via which said third reservoir is normally vented; and (c) said control valve having an exhaust port to which said third reservoir is connected, said exhaust port being cut off from said outlet in said second position of said control valve and communicated therewith in said first position, whereby said actuator cylinder is vented of fluid pressure to thereby allow said accelerator pedal to effect control of said fuel control lever.

3. A wheel slip control system, as recited in claim 2, wherein said venting of said actuator cylinder occurs initially at a relatively fast rate and thence at a relatively slow rate, whereby said fuel lever causes the power produced by said motor vehicle engine to increase accordingly to the selected setting of said accelerator pedal.

4. A wheel slip control system for regulating the power of a motor vehicle engine when a wheel slip condition of said vehicle arises upon acceleration thereof, comprising:

(a) at least one wheel driven by said motor vehicle engine;

(b) means for sensing the driven rotational speed of said at least one wheel;

(c) evaluation means for detecting said wheel slip condition of said vehicle in response to the sensed rotational speed of said at least one wheel exceeding a predetermined threshold value;

(d) a first reservoir normally charged with fluid under pressure;

(e) a fuel control lever having a spring bias urging said fuel control lever in a direction to decrease the power of said engine;

(f) an operator-controlled, fluid pressure regulating valve device having a supply port connected to said first reservoir and an outlet;

(g) a fluid pressure actuator cylinder between said outlet of said regulating valve and said fuel control lever to control the position of said fuel control lever according to the operator-controlled outlet pressure of said regulating valve device;

(h) a second reservoir;

(i) a first fluid flow restrictor via which said second reservoir is normally vented;

(j) a first control valve having an exhaust port to which said second reservoir is connected and an outlet connected to said actuator cylinder, said control valve being operated from a first position, in which fluid pressure communication between said exhaust port and said outlet is cut off, to a second position in which fluid pressure communication is established between said exhaust port and said outlet when said wheel slip condition is detected by said evaluation means, thereby venting said actuator cylinder initially at a relatively fast rate and thence at a relatively slow rate such that said spring-biased fuel control lever is operated to effect said decrease of the power produced by said motor vehicle engine accordingly; and (k) a second control valve having an inlet connected via a first flow path to said outlet of said operator's regulating valve and an outlet connected via a second flow path to said actuator cylinder in parallel with the connection of said first control valve outlet therewith via a third flow path, said second control valve being operated from a first position, in which said inlet and outlet thereof are communicated to a second position, in which said inlet and outlet thereof are cut off, when said first control valve is operated from said first position to said second position.

5. A wheel slip control system, as recited in claim 4, further comprising:

(a) said first and second control valves each being operated to said first position thereof in the absence of said wheel slip condition;

(b) a fourth flow path between said first flow path and said first control valve supply port;

(c) a third reservoir in said fourth flow path;

(d) a second fluid flow restrictor in said fourth flow path between said third reservoir and said first flow path;

(e) means for delaying said operation of said second control valve to said first position; and (f) said first control valve in said first position connecting said supply port thereof to said outlet thereof, whereby said actuator cylinder is presurized initially at a relatively fast rate and thereafter at a relatively slow rate, to cause said fuel control lever to accordingly increase the power of said motor vehicle to the selected setting of said regulating control valve.

6. A wheel slip control system, as recited in claim 5, further comprising one-way check valve means connected in parallel with said second control valve between said operator's regulating valve and said actuator cylinder via which said actuator cylinder is depressurized by said operator's regulating valve in bypass of said second control valve.

* * * * *